United States Patent
Hsu (12)

(10) Patent No.: US 6,623,614 B2
(45) Date of Patent: Sep. 23, 2003

(54) COVER STRUCTURE FOR ELECTRONIC DEVICE AND METHOD OF MANUFACTURING SAME

(75) Inventor: Che-Yuan Hsu, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/028,566

(22) Filed: Dec. 20, 2001

(65) Prior Publication Data

US 2003/0087071 A1 May 8, 2003

(30) Foreign Application Priority Data

Nov. 7, 2001 (TW) .......................................... 90127645 A

(51) Int. Cl.$^7$ .............................. C25D 5/56; C25D 5/34; C23C 28/00; B29C 59/00
(52) U.S. Cl. ....................... 205/166; 264/129; 264/478; 205/188; 205/190; 205/229; 205/208
(58) Field of Search ................................. 205/159, 164, 205/166, 188, 190, 229, 208; 264/74, 78, 129, 478

(56) References Cited

U.S. PATENT DOCUMENTS 4,193,848 A * 3/1980 Severus-Laubenteid ...... 204/28
6,335,906 B1 * 1/2002 Engelmann .................. 368/10

FOREIGN PATENT DOCUMENTS

JP        57-181391 A   * 11/1982

* cited by examiner

Primary Examiner—Edna Wong
(74) Attorney, Agent, or Firm—Wei Te Chung

(57) ABSTRACT

A cover structure for an electronic device includes a plastic cover, an aluminum or aluminum alloy layer on the plastic cover, and an oxide layer of aluminum or aluminum alloy on the aluminum or aluminum alloy layer. A method of manufacturing the cover structure includes: (1) injection molding the plastic cover; (2) forming the aluminum or aluminum alloy layer on the plastic cover; and (3) anodizing the aluminum or aluminum alloy layer to form an oxide layer thereof. The method also can include a step of coloring the oxide layer of aluminum or aluminum alloy. The cover structure thus formed has a metallic appearance with decorative colors or patterns, and is resistant to corrosion. The cover structure is not only very aesthetically pleasing to users but also durable.

9 Claims, No Drawings

COVER STRUCTURE FOR ELECTRONIC DEVICE AND METHOD OF MANUFACTURING SAME

BACKGROUND OF THE INVENTION

1. Field of the Invention

The present invention relates to cover structures of electronic devices and methods of manufacturing such cover structures, and particularly to a cover structure of an electronic device that has a plastic substrate and a method of manufacturing such cover structure.

2. Description of the Related Art

At present, plastic covers of electronic devices such as mobile phones generally comprise metal layers deposited on the plastic cover by plastic electroplating to obtain a decorative metallic appearance.

However, plastic electroplating can generally only deposit inert metals such as copper. Reactive metals such as aluminum can be deposited only with great difficulty. Furthermore, plastic electroplating is relatively complicated, resulting in unduly long processing times and unduly high costs.

To endeavor to overcome the foregoing drawbacks, U.S. Pat. No. 5,660,934 discloses a thermal spraying process for coating plastic articles with metal. However, the metal layer formed on the plastic article is easily eroded because it is directly exposed to the external environment. Furthermore, the metal layer has just a single color. This does not satisfactorily cater for consumer demand for a wide variety of aesthetically pleasing colors and designs.

Hence it is desired to provide a cover structure of an electronic device and a method of manufacturing the cover structure which can overcome the foregoing drawbacks of the related art.

SUMMARY OF THE INVENTION

A main object of the present invention is to provide a cover structure for an electronic device which has a metallic appearance with decorative colors or patterns.

Another object of the present invention is to provide a cover structure for an electronic device which resists corrosion.

A further object of the invention is to provide a method of manufacturing a cover structure for an electronic device which has a metallic appearance with decorative colors or patterns and which resists corrosion.

To achieve the above objects, a cover structure for an electronic device of the present invention includes a plastic cover, an aluminum or aluminum alloy layer on the plastic cover and an oxide layer of aluminum or aluminum alloy on the aluminum or aluminum alloy layer. A method of manufacturing the cover structure includes the steps of: (1) injection molding the plastic cover; (2) forming the aluminum or aluminum alloy layer on the plastic cover; and (3) anodizing the aluminum or aluminum alloy layer to form an oxide layer thereof.

The method also can include a step of coloring the oxide layer of aluminum or aluminum alloy. The cover structure thus formed has a metallic appearance with decorative colors or patterns, and is resistant to corrosion. The cover structure is not only very aesthetically pleasing to users but also durable.

DETAILED DESCRIPTION OF THE INVENTION

A cover structure for an electronic device according to a preferred embodiment of the present invention comprises a plastic cover, an aluminum or aluminum alloy layer on the plastic cover, and an oxide layer of aluminum or aluminum alloy on the aluminum or aluminum alloy layer. The plastic cover is made of ABS resin, or a combination of ABS resin and other suitable resins.

A method of manufacturing the cover structure of the electronic device comprises the following steps: (1) injection molding the plastic cover; (2) forming the aluminum or aluminum alloy layer on the plastic cover by thermal spraying; and (3) anodizing the aluminum or aluminum alloy layer on the plastic cover to form the oxide layer of aluminum or aluminum alloy.

In step (2), the molded plastic cover is firstly cleaned and then sandblasted. The molded plastic cover can then be firmly combined with the aluminum or aluminum alloy layer. A dimension of quartz sand used for sandblasting is 1–3 mm, and a surface roughness of the sandblasted plastic cover is 4–15 $\mu$m.

The thermal spraying in step (2) can be wire arc spraying, powder plasma spraying, or high velocity oxy-fuel spraying. During spraying, a spraying head of a spraying gun is located 150–350 mm from the plastic cover. A thickness of the aluminum or aluminum alloy sprayed on the plastic cover in a single cycle of spraying is 0.1–0.4 mm, and spraying is continued until the aluminum or aluminum alloy layer has a thickness of 0.6–1.2 mm. Then the aluminum or aluminum alloy layer is mechanically ground and polished.

A description of step (3) with reference to the following preferred embodiments follows:

Embodiment 1

First, the plastic cover having the polished aluminum or aluminum alloy layer is degreased and cleaned with water. The plastic cover is chemically processed and cleaned with water for a second time. The plastic cover is immersed in an electrolytic bath. The electrolytic bath contains an electrolyte such as a mixture of sulfuric acid and sulfosalicylic acid, wherein the concentration of sulfuric acid and sulfosalicylic acid are respectively 0.1–1.0% by weight and 10–20% by weight. Direct current power is applied to the electrolytic bath. A voltage of the direct current power is 40–80 V, and a current density of the direct current power is 1–4 A/dm$^2$. The direct current power is applied for between 15 minutes and one hour under a temperature of 18–23° C. until a colorful oxide layer about 3–30 $\mu$m thick has formed on the surface of the aluminum or aluminum alloy layer. Finally, the oxide layer of aluminum or aluminum alloy is given sealing treatment to complete the manufacturing of the cover structure.

Embodiment 2

First, the plastic cover having the polished aluminum or aluminum alloy layer is degreased and cleaned with water. The plastic cover is electrolytically or chemically polished and cleaned with water for a second time. The plastic cover is immersed in an electrolytic bath. The electrolytic bath contains an aqueous electrolyte such as sulfuric acid. A concentration of sulfuric acid is 150–2000 g/l. Direct current power is applied to the electrolytic bath. A voltage of the direct current power is 12–20 V, and a current density of the direct current power is 1–2 A/dm$^2$. The direct current power is applied for between 15 minutes and one hour under a temperature of 18–23° C. until an oxide layer about 3–30 $\mu$m thick has formed on the surface of the aluminum or aluminum alloy layer.

Then, the oxide layer of aluminum or aluminum alloy is colored by adsorptive coloring or electrolytic coloring.

Thus, a decorative color or pattern is obtained on the surface of the oxide layer. Finally, the colored oxide layer of the aluminum or aluminum alloy is given sealing treatment to complete the manufacturing of the cover structure.

It will be apparent that many changes and modifications of the several features described herein may be made with departing from the spirit and scope of the present invention. It is therefore apparent that the foregoing description is by way of illustration of the invention rather than limitation of the invention.

I claim:

1. A method of manufacturing a cover structure for an electronic device comprising the steps of:

(1) injection molding a plastic substrate;

(2) forming a metal or alloy layer directly applied on the substrate by thermal spraying; and (3) anodizing the metal or alloy layer to form an oxide layer thereof.

2. The method of manufacturing the cover structure as claimed in claim 1, wherein the metal or alloy layer is anodized by color anodizing.

3. The method of manufacturing the cover structure as claimed in claim 1, wherein the metal or alloy layer is an aluminum or aluminum alloy layer.

4. The method of manufacturing the cover structure as claimed in claim 1, further comprising a step of sealing the oxide layer of the metal or alloy layer after step (3).

5. The method of manufacturing the cover structure as claimed in claim 1, wherein, in the step (2) before thermal spraying, the substrate is firstly cleaned and then sand-blasted.

6. The method of manufacturing the cover structure as claimed in claim 1, wherein, during said thermal spraying, a spraying head of a spraying gun is located 150–350 mm from the substrate, a thickness of the metal or alloy layer sprayed on the substrate in a single cycle of spraying is 0.1–0.4 mm, and said spraying continues until the metal or alloy layer has a thickness of 0.6–1.2 mm.

7. The method of manufacturing the cover structure as claimed in claim 1, further comprising a step of coloring the oxide layer of the metal or alloy layer after step (3).

8. The method of manufacturing the cover structure as claimed in claim 7, wherein the metal or alloy layer is colored by adsorptive coloring or electrolytic coloring.

9. The method of manufacturing the cover structure as claimed in claim 1, wherein said anodizing is performed in an electrolytic bath containing an aqueous electrolyte at a voltage of 12–80V and a current density of 1–4 A/dm$^2$.

* * * * *